United States Patent
Ehrenberg

(10) Patent No.: US 7,740,679 B2
(45) Date of Patent: Jun. 22, 2010

(54) AIR FILTER ELEMENT WITH COMPOSITE MOLDED END CAP

(75) Inventor: Brian Ehrenberg, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 796 days.

(21) Appl. No.: 11/405,725

(22) Filed: Apr. 18, 2006

(65) Prior Publication Data

US 2007/0240394 A1 Oct. 18, 2007

(51) Int. Cl.
*B01D 46/00* (2006.01)
*B29C 67/22* (2006.01)

(52) U.S. Cl. .................. 55/498; 55/502; 55/DIG. 5; 264/46.4; 264/46.9; 264/260; 264/138; 264/152; 264/247; 264/254; 264/DIG. 48

(58) Field of Classification Search ........... 55/498, 55/499, 502, 510, 521, DIG. 5; 264/46.4, 264/46.9, 260, DIG. 48, 138, 152, 247, 254
See application file for complete search history.

(56) References Cited

U.S. PATENT DOCUMENTS

| 4,082,071 | A | * | 4/1978 | Jones ........................... 123/573 |
| 4,569,813 | A | * | 2/1986 | Taki et al. ..................... 264/259 |
| 4,714,574 | A | * | 12/1987 | Tenhagen ................... 264/45.1 |
| 4,720,292 | A |   | 1/1988 | Engel et al. |
| 4,957,672 | A | * | 9/1990 | Carter et al. ................ 264/45.5 |
| 5,344,601 | A | * | 9/1994 | Newton ....................... 264/255 |
| 5,484,466 | A |   | 1/1996 | Brown et al. |
| 5,660,771 | A | * | 8/1997 | Dunfee et al. .............. 264/46.4 |
| 6,126,877 | A | * | 10/2000 | Gille et al. ................... 264/138 |
| 6,159,261 | A | * | 12/2000 | Binder et al. ................. 55/502 |
| 6,447,567 | B1 | * | 9/2002 | Ehrenberg ..................... 55/498 |
| 6,830,443 | B1 | * | 12/2004 | Coffey et al. ................ 425/116 |
| 6,955,701 | B2 | * | 10/2005 | Schrage ....................... 55/498 |
| 7,083,661 | B2 | * | 8/2006 | Hasegawa et al. ............. 55/498 |
| 2007/0084170 | A1 | * | 4/2007 | Ehrenberg ..................... 55/498 |
| 2008/0276582 | A1 | * | 11/2008 | Boehrs et al. ................. 55/497 |

* cited by examiner

*Primary Examiner*—Duane Smith
*Assistant Examiner*—Minh-Chau T Pham
(74) *Attorney, Agent, or Firm*—Reinhart Boerner Van Deuren P.C.

(57) ABSTRACT

A method and apparatus are provided for constructing a filter element, having enhanced structural capabilities, through use of a molded end cap having first and second foam portions of differing physical properties meeting at a common juncture of the first and second foam portions and simultaneously cured with one another.

37 Claims, 4 Drawing Sheets

AIR FILTER ELEMENT WITH COMPOSITE MOLDED END CAP

FIELD OF THE INVENTION

This invention relates to air filters, and more particularly to air filters having one or more end caps formed either wholly or partially from molded foam material.

BACKGROUND OF THE INVENTION

Filter elements, having media packs of pleated paper or other appropriate materials, are commonly used on over-the-road trucks, agricultural, automotive and off-highway equipment for preventing dirt, dust, and moisture from entering machinery, such as an engine or an air compressor, with the incoming air supply. In one popular style of such filters, the filter element includes a tubular-shaped media pack having an open end, configured to tightly engage a pipe or conduit supplying air to an engine, with the opposite end of the tubular-shaped media pack being closed by a closed end cap. Typically such filter elements are mounted in a housing, in such a manner that air flows through the filter element in an outside-in direction. Contaminants in the air stream are removed as the incoming air flows through the media pack. Often, the closed end cap includes one or more compliant ribs for aiding in properly positioning the filter element within the housing, and/or for providing additional structural and sealing functions at the juncture between the filter element and the housing.

In the design of such filter elements, a number of factors must be considered. Generally such filter elements must be produceable at low cost, so that they can be replaced, without significant expense, at regular intervals. It is also desirable that such filter elements be constructed in such a manner that they are readily incinerable or recyclable.

In addition to being produceable at low cost, in a manner that is readily disposable or recyclable, it is necessary that the filter element be designed in a manner which is structurally efficient and effective, so that the filter element can withstand the considerable forces to which the elements may be exposed during operation. As the filter element becomes increasingly plugged with contaminants removed from the incoming air, the pressure drop across the tubular-shaped media pack increases. The filter element must be constructed in such a manner that it can withstand inwardly directed forces, caused by the increased pressure drop, to preclude having the media pack be deformed inwardly when the media pack has absorbed its maximum rated capacity of contaminants.

The radially inwardly directed force of the incoming air, as the filter media pack becomes increasingly dirty, can also cause problems in maintaining the radial seal between the filter element and the pipe or conduit supplying air to the engine. Commonly assigned U.S. Pat. No. 6,447,567 B1, to Ehrenberg, the disclosure of which is incorporated herein in its entirety, discloses an air filter element having an integral radial seal gasket which is particularly well suited to maintaining the radial seal under demanding operating conditions. Specifically, Ehrenberg '567 includes a substantially stiff insert ring, which in combination with an inner liner provides improved resistance of the media pack to inwardly directed forces.

Ehrenberg '567 also discloses forming both an open and a closed end cap, at opposite ends of a tubular-shaped media pack, from foam materials, in a manner which is highly conducive to low-cost manufacturing of filter elements. Specifically, Ehrenberg '567 discloses a closed end cap formed entirely of a molded polyurethane material extending over the ends of an inner and outer liner and into the end of the media pack, thereby providing a configuration which is highly manufacturable. Although the one-piece, molded end cap of Ehrenberg '567 provides a highly efficient and effective structure under most operating conditions, for applications where the inwardly directed air forces are substantial, and/or applications where the inner diameter of the tubular-shaped media pack is of a large size, a one-piece end cap, as taught by Ehrenberg '567, may not provide sufficient strength.

One approach to providing additional strength in a closed end cap is illustrated by U.S. Pat. No. 5,484,466 to Brown, et al., which discloses reinforcing the closed end cap of a filter element with a plate, or pedestal of metal or stiff plastic. Although reinforcing a closed end cap of a filter element with a plate or pedestal of metal or stiff plastic, as disclosed in Brown '466, is highly effective in strengthening the end cap, the addition of the reinforcement undesirably increases the complexity and cost of producing a filter element.

It is desirable, therefore, to provide an improved filter element, and a method for making such an improved filter element, having additional resistance to operational loads on the filter element, without the use of additional reinforcing plates to the closed end of the filter element.

BRIEF SUMMARY OF THE INVENTION

The invention provides an improved filter element, having enhanced structural capabilities, through use of a molded end cap having first and second foam portions of differing physical properties meeting at a common juncture of the first and second foam portions and simultaneously cured with one another. The invention may be practiced in a variety of forms, including a filter element, and a method for constructing a filter element.

In one form of the invention, a method is provided for constructing a filter element having a tubular-shaped media pack, defining a longitudinal axis about which the tubular-shaped media pack is disposed, and terminating at one end thereof in an end cap, by molding the end cap to have first and second foam portions of differing physical properties meeting at a common juncture thereof and simultaneously cured with one another. The common juncture may define a cured thickness of the end cap adjacent the common juncture, with a method according to the invention further including the steps of: providing a mold having a first cavity and a second cavity thereof, separated from one another by a rib disposed substantially at the common juncture and having a height less than the cured thickness of the end cap adjacent the common juncture; placing uncured material of the first foam portion into the first cavity of the mold to a level less than the height of the rib in the mold; placing uncured material of the second foam portion into the second cavity of the mold to a level less than the height of the rib in the mold; and curing the material in the first and second mold cavities in a manner causing the material in the first and second cavities to foam, rise to the cured thickness, and join integrally along the common juncture.

In some forms of a method, according to the invention, the tubular-shaped media pack may define an inner boundary thereof, with the common juncture between the first and second foam portions being located substantially at the inner boundary of the media pack. A method, according to the invention, may further include forming the second foam portion from a foam material having a greater rigidity than the first foam portion. A method, according to the invention, may include inserting an axial end of the filter media pack into the uncured material in the mold. The mold may include a media pack locator for engaging the axial end of the medial pack, to thereby position the media pack within the mold, with the method including engaging the media pack locator with the axial end of the media pack.

In some forms of the invention, the first mold cavity may define at least one secondary cavity therein, for forming a protruding compliant feature on the first foam portion of the end cap, with the method including forming a protruding compliant feature on the first foam portion of the end cap concurrently with curing the foam material of the first portion of the end cap.

In some forms of the invention, where a filter element includes an additional component, such as an inner and/or outer liner, molded into the end cap, a method, according to the invention, may include inserting at least a portion of the additional component into the uncured material in the mold, prior to curing the material in the mold.

The invention may be practiced in forming either open or closed end caps of a filter element having a tubular-shaped media pack. Where the tubular-shaped media pack defines an inner boundary thereof, the first portion of a closed end cap, according to the invention, may be disposed radially outward of the second foam portion and the common juncture between the first and the second foam portions of the closed end cap may be located substantially at the inner boundary of the media pack. The second foam portion may be formed from a material having a greater rigidity than the first foam portion.

The invention may take the form of a filter element, including a media pack and an end cap molded onto the media pack at one axial end thereof. The media pack may define a longitudinal axes about which the media pack is disposed, with the media pack terminating at axial ends thereof. The molded end cap may have first and second foam portions of differing physical properties meeting at a common juncture thereof and simultaneously cured with one another. Where the media pack is tubular-shaped and defines an inner boundary thereof, the common juncture may be located substantially at the inner boundary of the tubular-shaped media pack, and the second foam portion may be formed from a foam material having a greater rigidity than the first foam portion. The first foam portion may include a protruding compliant feature, to perform various functions such as positioning the filter element in a housing, and/or providing a seal between the filter element and the housing or an outlet air tube of a filter apparatus. A filter element, according to the invention, may further include one or more additional components, such as inner and/or outer liners, operatively attached to the media pack by the molded end cap.

In one form of the invention, a filter element includes a tubular-shaped media pack, an inner liner, and a closed end cap. The tubular-shaped media pack defines an inner boundary thereof, a longitudinal axis about which the medial pack is disposed, and an axial end of the media pack. The inner liner is disposed along and conforms substantially to the inner boundary of the media pack. The closed end cap is molded onto the axial end of the media pack and inner liner. The closed end cap has first and second simultaneously cured foam portions thereof, meeting at a common juncture of the first and second foam portions, with the common juncture being disposed substantially at the inner boundary of the media pack. The first foam portion of the closed end cap may be disposed radially outward of the second foam portion. The second foam portion may have a greater rigidity than the first foam portion. The first foam portion may further include a protruding compliant feature. The media pack may further define a second axial end thereof, with the filter element further including an open end cap attached to the second axial end. The open end cap may include a substantially radially rigid element operatively engaging the inner liner. The open end cap may also include a molded portion thereof securing the substantially rigid element to the second axial end of the media pack. The molded portion of the open end cap may include a foam material portion thereof, forming a radial seal gasket. The tubular-shaped media pack may also define an outer boundary thereof, with the filter element further including an outer liner disposed substantially at the outer boundary and secured to the media pack by the open and closed end caps.

Other aspects, objects and advantages of the invention will be apparent from the following detailed description and accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
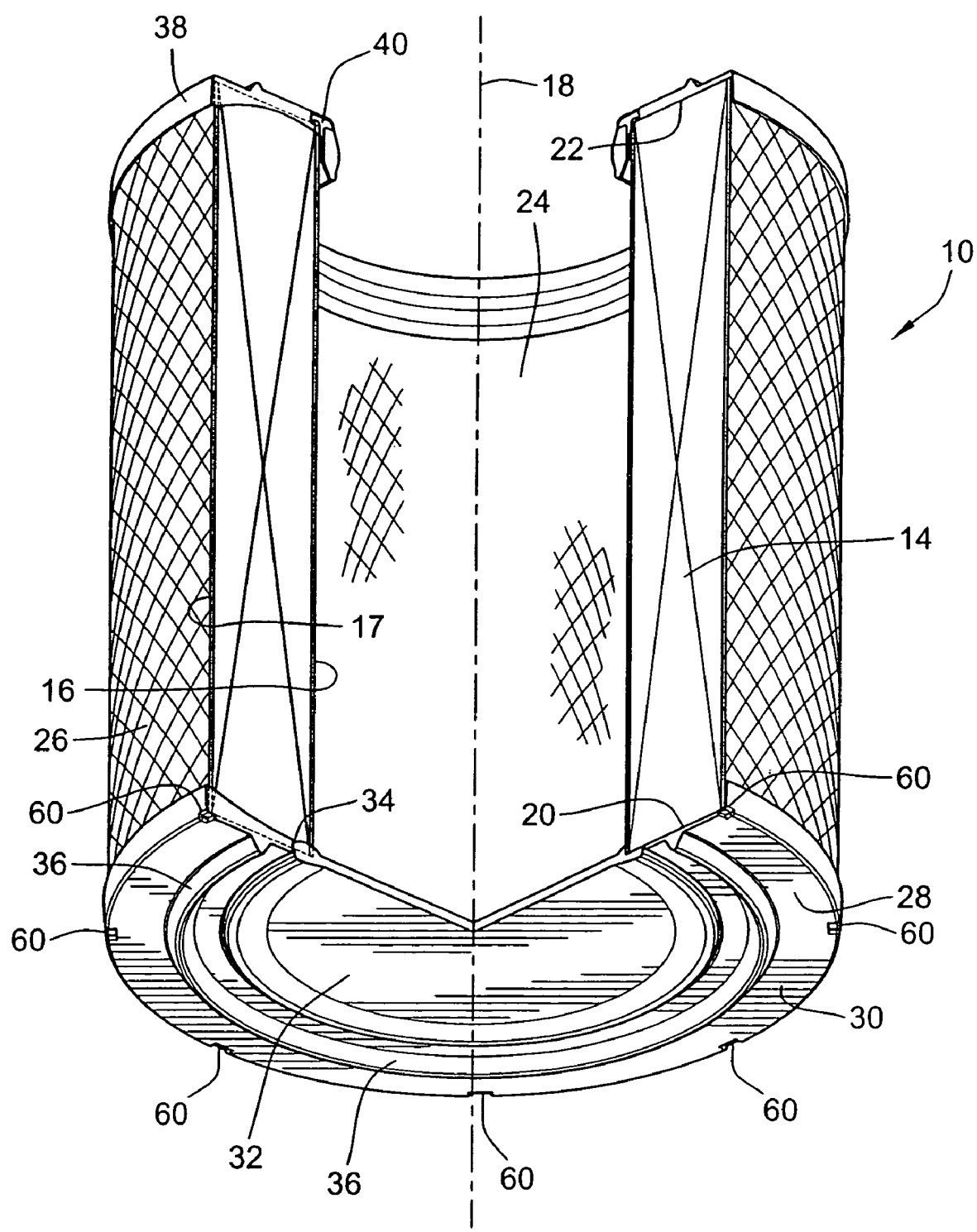
FIG. 1 is a perspective illustration of an exemplary embodiment of a filter element, according to the invention.
Figure 2:
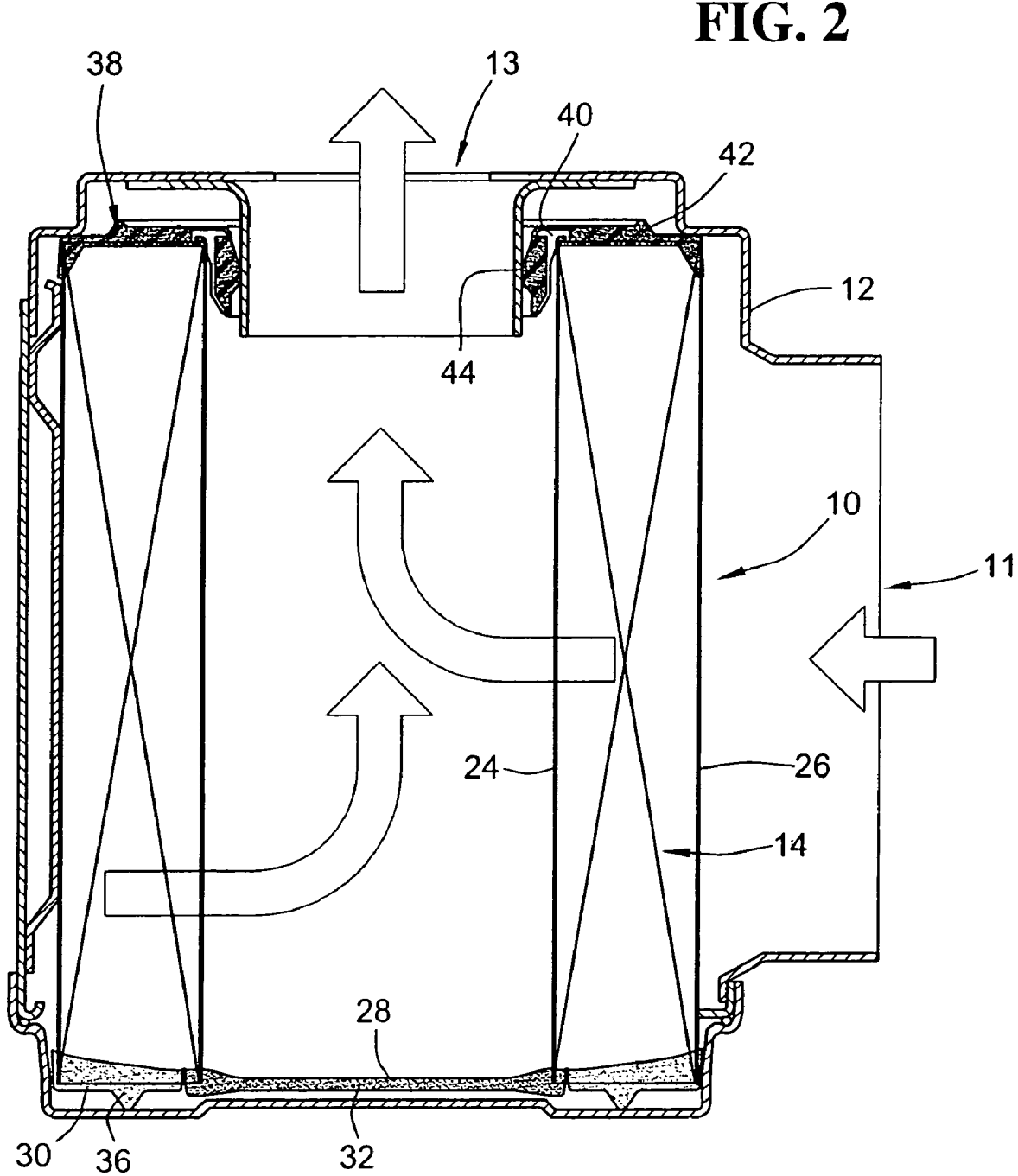
FIG. 2 is a cross-sectional illustration of a filter apparatus, showing the exemplary embodiment of the filter element of FIG. 1 installed in a filter housing.

FIG. 1 shows a first exemplary embodiment of the invention, in the form of a filter element 10, adapted for installation into a filter housing 12 in the manner illustrated in FIG. 2, to provide filtration of air flowing into the housing 12 from an inlet 11, and exiting the housing through an outlet 13.

As shown in FIG. 1, the exemplary embodiment of the filter element 10 includes a tubular-shaped media pack 14, formed from a suitable material, such as pleated filter paper, through which the air being filtered flows in an outside-to-inside direction through the media pack 14. The media pack 14 defines an inner boundary 16 thereof, a longitudinal axis 18, about which the media pack 14 is disposed, and first and second axial ends 20, 22 of the media pack 14.

An inner liner 24 is disposed along and conforms substantially to the inner boundary 16 of the media pack 14. In similar fashion, an outer liner 26 is disposed substantially along and conforms substantially to the outer boundary 17 of the media pack 14.

A closed end cap 28 is molded onto the first axial end of 20 of the media pack 14 in a manner encapsulating the first end 20 of the media pack 14 and a portion of the inner and outer liners 24, 26 adjacent the first axial end 20 of the media pack 14. The closed end cap 28 includes a first and second foam portions 30, 32 thereof, meeting at a common juncture 34, of the first and second foam portions 30, 32, disposed substantially at the inner boundary 16 of the media pack 14. The first foam portion 30 of the closed end cap 28 is disposed radially outward of the second foam portion 32, in the exemplary embodiment of the filter element 10, with the common juncture 34 between the first and second foam portions 30, 32 being positioned slightly radially outward of the inner boundary 16 of the media pack 14.

In various embodiments of the invention, the common juncture 34 may be located at various positions appropriate to the application and design of the end cap of a given filter element embodiment, with the term "substantially at the inner boundary of the media pack," as used herein, being contemplated to include an arrangement, such as the one shown in the exemplary embodiment of the filter element 10, and other arrangements wherein the common juncture 34 is reasonably proximate to the inner boundary 16 of the media pack 14. It will also be appreciated, by those having skill in the art, that, although the common juncture 34 in the exemplary embodiment of the filter element 10 described herein has a substantially cylindrical shape generally matching the cylindrical shape of the media pack 14, the common juncture 34 may take a virtually unlimited variety of other forms in other embodiments of the invention. For example, in embodiments of the invention where the filter may have another shape, such as the well known race-track tubular shape, the common juncture between foam portions of an end cap, according to the invention, may also have a race-track shape. It will be further appreciated, that the common juncture need not necessarily have a shape matching that of a media pack in a filter element according to the invention. The common juncture may, for example, have a curvilinear shape, a polygonal shape, a serpentine shape, or any other shape or form appropriate and conducive to practicing the invention.

The first and second foam portions 30, 32, of the closed end cap 28, are molded onto the first axial end 20 of the media pack 14 by a method, to be described in greater detail below, allowing the first and second foam portions 30, 32 to be simultaneously cured with one another, without mixing with one another. In the exemplary embodiment of the filter element 10, the second foam portion 32 of the end cap 28 is formed in a manner causing it to have a greater rigidity than the first foam portion 30, when the first and second foam portions 30, 32 are fully cured.

The first foam portion 30, of the closed end cap 28 of the exemplary embodiment of the filter element 10 also includes a protruding compliant feature, in the form of a positioning rib 36, to aid in retaining the filter element 10 in a desired axial position, when the filter element 10 is installed into the filter housing 12, in the manner shown in FIG. 2.

As shown in FIGS. 1 and 2, the exemplary embodiment of the filter element 10 also includes an open end cap, substantially of the type taught in Ehrenberg '567, attached to the second axial end 22 of the media pack 14. The open end cap includes a substantially radially rigid element 40, operatively engaging the inner liner 24, in a manner reinforcing the inner liner 24. The open end cap 38 also includes a molded portion 40 thereof, which performs a dual function of securing the rigid element 40 to the media pack 14, and forming a radially acting seal with the filter housing 12, as indicated at 44 in FIG. 2.

In the exemplary embodiment of the filter element 10, the molded portion 42 of the open end cap 38 is illustrated as being formed from a foam material, which is highly conducive to forming an effective radial seal 44 between the filter element 10 and the housing 12. In other embodiments of the invention, the molded portion 42 may be formed from non-foamed materials, or a combination of foamed and non-foamed resilient materials.

Those having skill in the art will recognize that, although the exemplary embodiment of the filter element 10 described herein includes the rigid element 40 in the open end cap 38, in other embodiments of the invention it may be desirable to form an open end cap, in the same manner described herein with regard to the closed end cap 28 of the exemplary embodiment of the filter element 10, in which first and second foam portions of the open end cap are formed from materials having different rigidities, in a manner that allows the separate rigid element 40 of the open end cap 38 of the exemplary embodiment of the filter element 10 described herein to be eliminated. It will also be recognized by those having skill in the art, that the term "closed end cap", as used herein is intended to encompass other forms of end caps which reasonably fall within the definition of a closed end cap, even though they may include small perforations therethrough, or various shaped openings which are operatively closed by another element of a filter apparatus, when the filter element having a closed end cap, according to the invention, is operatively installed into the filter apparatus.

A method of forming the closed end cap 28 of the exemplary embodiment of the filter element 10 will now be described with reference to the steps illustrated in FIGS. 3-6, using a mold 46 having a first cavity 48 and a second cavity 50 thereof, separated from one another by a rib 52 disposed substantially at the common juncture 34 and having a height "h" (see FIGS. 3 and 6) less than a cured thickness "t" (see FIG. 6) of the closed end cap 28 adjacent the common juncture 34, with the relationship between the height "h" of the rib 52 in the mold 46 and the thickness "t" being best illustrated in FIGS. 3 and 6.

Figure 3:
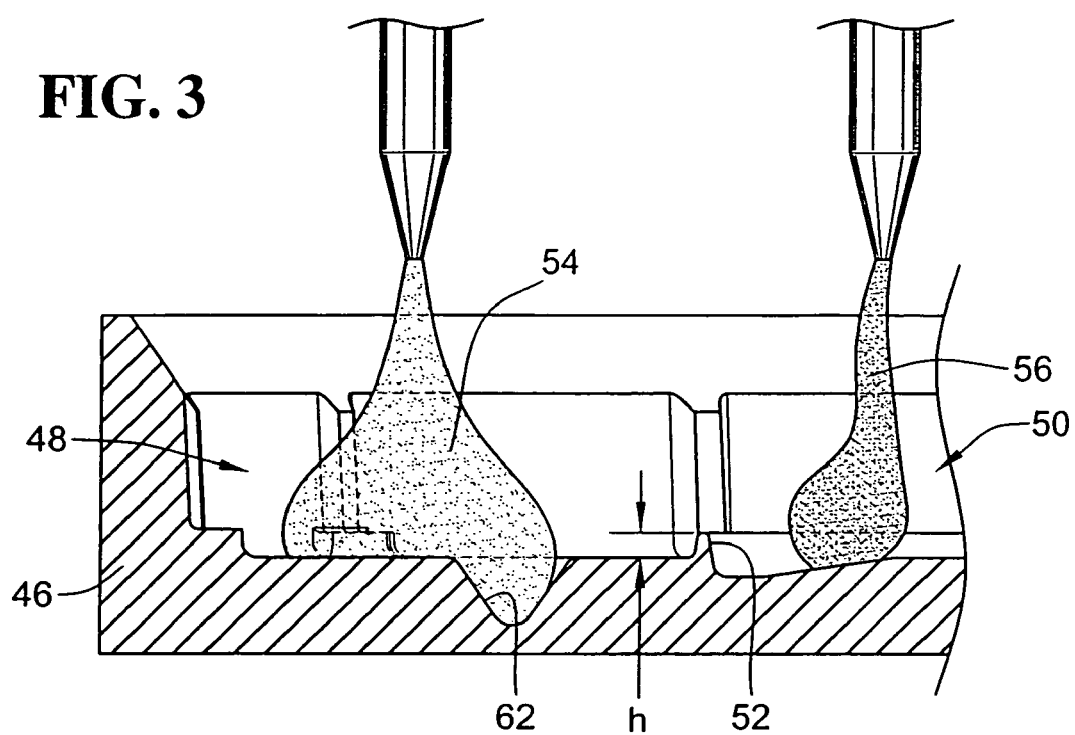
FIGS. 3-6 are enlarged partial cross-sections illustrating a method, according to the invention, for forming an end cap on a media pack of the exemplary embodiment of the filter element shown in FIG. 1.

As shown in FIG. 3, a measured amount of uncured material 54 of the first foam portion 30 of the closed end cap 28 is placed into the first cavity 48 of the mold 46 to a level less than the height "h" of the rib 52 of the mold 46. In similar fashion, a measured amount of uncured material 56 of the second foam portion 32 of the closed end cap 28 is placed into the second cavity 50 of the mold 46 to a level less than the height "h" of the rib 52 of the mold 40. In the exemplary embodiment of the invention, the foam materials used to form the first and second foam portions 30, 32 may consist of a two part formulation of a polyurethane material and an activator material which, when mixed together, almost immediately cause the polyurethane material to foam and begin to fill the first and second mold cavities 48, 50, as indicated in FIG. 4.

Figure 4:
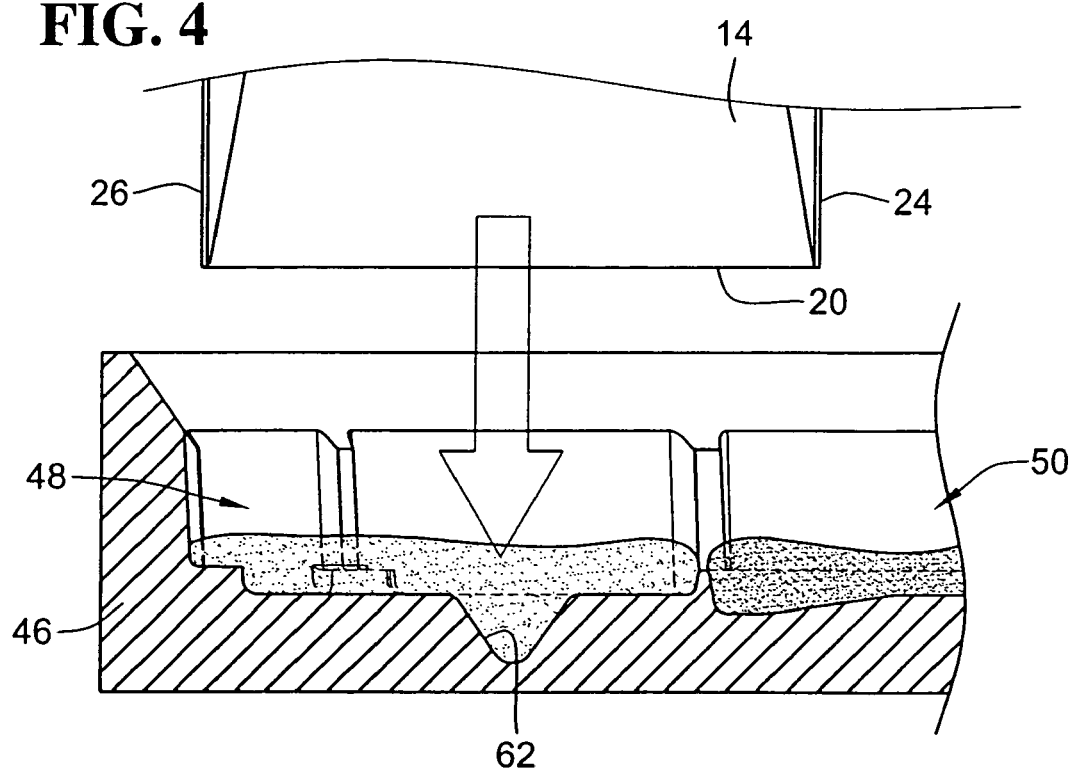
Figure 5:
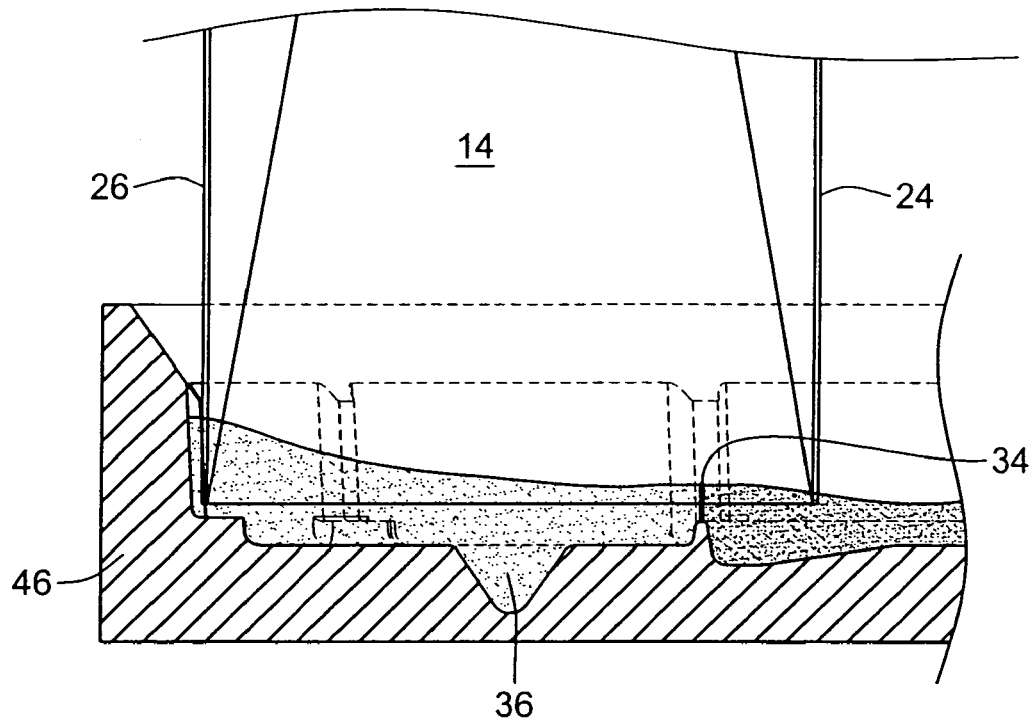
Figure 6:
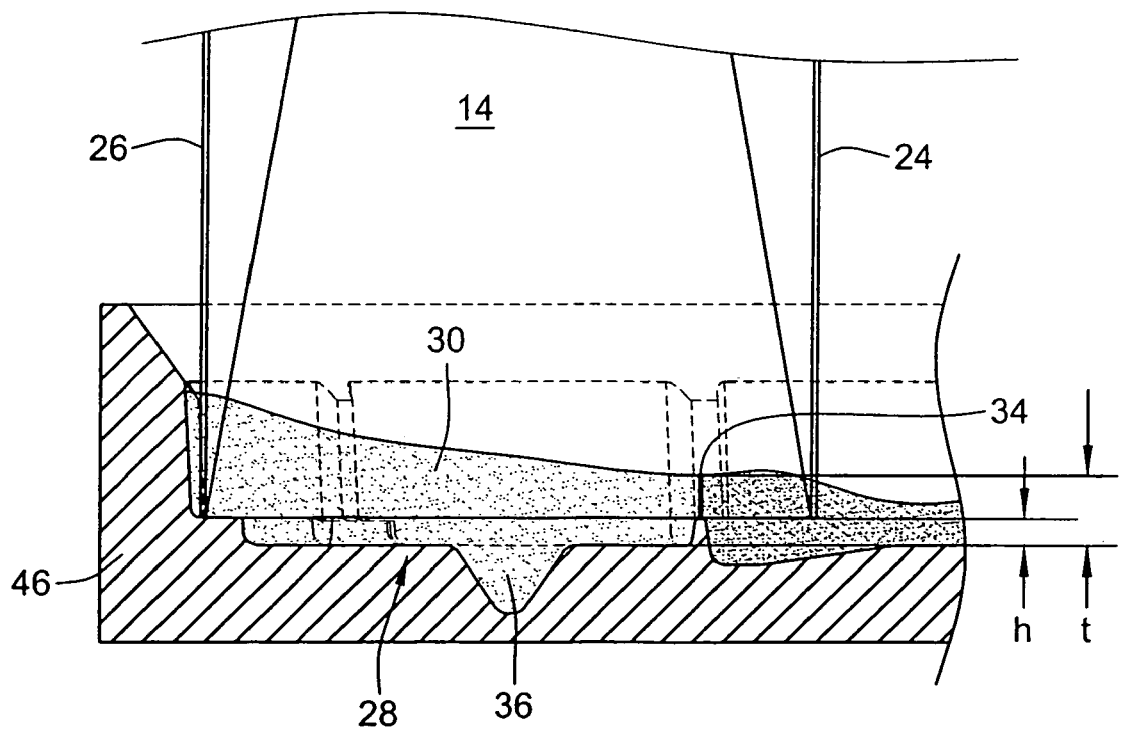

As shown in FIG. 4, once the measured amounts of uncured materials 54, 56 are placed into the first and second cavities 48, 50 of the mold 46, the first axial end 20 of the media pack 14, with the inner and outer liners 24, 26 installed thereon, is inserted into the mold 46, as shown in FIGS. 4-6, until the first axial end 20 of the media pack 14 is brought into abutment with a series of media pack locators 58 radially spaced about the outer circumference of the first cavity 48, to thereby provide convenient and repetitive control of the depth of insertion of the media pack 14 into the mold 46. As will be understood from an examination of FIG. 1, although these media pack locators 58 leave small depressions 60 in the bottom surface, as shown in FIG. 1, of the closed end cap 28, the depressions 60 have no significant detrimental effect on the operation of the completed filter element 10.

Once the first axial end 20 of the media pack 14 is brought into abutment with the media pack locators 58 of the mold 46, the media pack 14 is left in place while the foam materials 54, 56 of the first and second foam portions 30, 32 of the closed end cap 28 continue to expand upward into the filter media at the end of the media pack 14 and around the ends of the inner and outer liners 24, 26. As the foam materials 54, 56 continue to expand and cure, they rise above the height "h" of the rib 52 and come into abutment with one another to form the common juncture 34 between the first and second foam portions 30, 32 of the closed end cap 28, and eventually rise to the cured thickness "t" of the end cap 28 at the common juncture 34.

The materials selected for formation of the first and second foam portions 30, 32 are of such a nature that they will join together at the common juncture 34, through cross-linking or other processes, in such a manner that, although the closed end cap 28 has two distinct first and second foam portions 30, 32, the closed end cap 28 essentially becomes a single piece when the materials 54, 56 are completely cured.

Depending upon the particular materials 54, 56 selected for formation of the closed end cap 28, the media pack 14 may need to remain in the mold 46, until the materials 54, 56 are completely expanded and cured. In some embodiments of the invention, however, it is contemplated that the materials 54, 56 may allow the media pack 14, with the closed end cap 28 attached thereto, to be removed from the mold 46 and set aside part way through the curing cycle, to thereby free up the mold 46 for use in constructing another filter element.

In the exemplary embodiment of the filter element 10, the material 56 of the second foam portion of the end cap 28 is selected to provide a cured second foam portion 32 having a greater rigidity than the material 54 selected for forming the first foam portion 30 of the end cap 28. It will be further noted that the materials 54 selected for the first foam portion 30 of the end cap is somewhat compliant in its fully cured state, to thereby provide resilience to the positioning bead 36 of the closed end cap 28. As shown in FIGS. 3-6, the positioning bead 36 is formed concurrently with the first foam portion 30 of the end cap 28 in a secondary cavity 62 of the mold 46.

Those having skill in the art will recognize, that by virtue of the arrangement described above, the second foam portion 32 of the closed end cap 28 provides significant additional rigidity of the filter element 10, in a manner which makes the filter element 10 substantially stronger, without having to resort to the inclusion of stiffening plates or pedestals of the type used in prior filter elements. It will be further appreciated, that the particular arrangement of components described above in relation to the exemplary embodiment of the filter element 10 results in the rigid foam of the second foam portion 32 locking the inner liner 24, the media pack 14 solidly together in a manner which creates a strong supporting structure extending along the inner boundary 16 of the filter element 10. It will be yet further appreciated, that, in combination with the construction of the open end cap 38 of the exemplary embodiment, as described above, and in particular the manner in which the rigid element 40 of the open end cap 38 is locked into engagement with the inner liner 24 by the molded portion 42 of the open end cap 38, a very robust structure is provided which is capable of withstanding considerable radially and axially directed forces acting against the filter element 10.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for constructing a filter element having a tubular-shaped media pack, defining a longitudinal axis about which the tubular-shaped media pack is disposed, and terminating at one end thereof in an end cap, the method comprising molding the end cap from first and second foam portions of differing physical properties meeting at a common juncture thereof and simultaneously cured with one another, wherein the second foam portion is molded from a material more rigid than the first foam portion, such that the second foam portion extends inward from an inner periphery of the first foam portion.

2. The method of claim 1, wherein the common juncture defines a cured thickness of the end cap adjacent the common juncture, and the method further comprises the steps of:
   providing a mold having a first cavity and a second cavity thereof separated from one another by a rib disposed substantially at the common juncture, and having a height less than the cured thickness of the end cap adjacent the common juncture;
   placing uncured material of the first foam portion into the first cavity of the mold to a level less than the height of the rib in the mold;
   placing uncured material of the second foam portion into the second cavity of the mold to a level less than the height of the rib in the mold; and
   curing the material in the first and second mold cavities in a manner causing the material in the first and second cavities to foam, rise to the cured thickness, and join integrally together along the common juncture.

3. The method of claim 2, wherein, the tubular-shaped media pack defines an inner boundary thereof, with the common juncture being substantially at the inner boundary of the media pack, and the method further comprises, forming the second foam portion from a foam material having a greater rigidity than the first foam portion.

4. The method of claim 3, wherein the first mold cavity defines at least one secondary cavity therein for forming a protruding compliant feature on the first foam portion of the end cap, and the method further comprises, forming a protruding compliant feature on the first foam portion of the end cap concurrently with curing the foam material of the first portion of the end cap.

5. The method of claim 2, further comprising, inserting an axial end of the filter media pack into the uncured material in the mold.

6. The method of claim 5, wherein, the mold further includes a media pack locator for engaging the axial end of the media pack, to thereby position the media pack within the mold, and the method further comprises engaging the media pack locator with the axial end of the media pack.

7. The method of claim 5, wherein the filter element includes an additional component molded into the end cap, and the method further comprises, inserting at least a portion of the additional component into the uncured material in the mold, prior to curing the material in the mold.

8. The method of claim 1, wherein, the end cap is a closed end cap, and the tubular-shaped media pack defines an inner boundary thereof, with the first foam portion of the closed end cap being disposed radially outward of the second foam portion and the common juncture being substantially at the inner boundary of the media pack.

9. The method of claim 6, further comprising, forming the second foam portion from a foam material having a greater rigidity than the first foam portion.

10. The method of claim 9, further comprising, forming a protruding compliant feature on the first foam portion of the closed end cap.

11. The method of claim 8, wherein the common juncture defines a cured thickness of the closed end cap adjacent the common juncture, and the method further comprises the steps of:
    providing a mold having a first cavity and a second cavity thereof separated from one another by a rib disposed substantially at the common juncture, and having a height less than the cured thickness of the closed end cap adjacent the common juncture;
    placing uncured material of the first foam portion into the first cavity of the mold to a level less than the height of the rib in the mold;
    placing uncured material of the second foam portion into the second cavity of the mold to a level less than the height of the rib in the mold; and
    curing the material in the first and second mold cavities in a manner causing the material in the first and second cavities to foam, rise to the cured thickness, and join integrally together along the common juncture.

12. The method of claim 1, wherein the first mold cavity defines at least one secondary cavity therein for forming a sealing feature on the first foam portion of the closed end cap, and the method further comprises, forming a protruding compliant feature on the first foam portion of the closed end cap concurrently with curing the foam material of the first portion of the closed end cap.

13. The method of claim 11, further comprising, inserting an axial end of the filter media pack into the uncured material in the mold.

14. The method of claim 13, wherein the filter element includes an additional component molded into the closed end cap, and the method further comprises, inserting at least a portion of the additional component into the uncured material in the mold, prior to curing the material n the mold.

15. A filter element comprising:
    a media pack, defining a longitudinal axis about which the media pack is disposed, the media pack terminating at axial ends thereof; and
    an end cap, molded onto the media pack at one axial end thereof, and having first and second foam portions of differing physical properties meeting at a common juncture thereof and simultaneously cured with one another;
    wherein the first foam portion is molded as an outer annular portion of the end cap and made from a compliant material; and
    wherein the second foam portion is molded from a material more rigid than the first foam portion, and extends inward from an inner periphery of the first foam portion.

16. The filter element of claim 15, wherein, the media pack is tubular-shaped and defines an inner boundary thereof, with the common juncture being substantially at the inner boundary of the tubular-shaped media pack, and the second foam portion is a foam material having a greater rigidity than the first foam portion.

17. The filter element of claim 16, wherein, the first foam portion further comprises a protruding compliant feature.

18. The filter element of claim 15, further comprising, an additional component operatively attached to the media pack by the molded end cap.

19. A filter element comprising:
    a tubular-shaped media pack, defining an inner boundary thereof, a longitudinal axis about which the media pack is disposed, and an axial end of the media pack;
    an inner liner disposed along and conforming substantially to the inner boundary of the media pack; and
    a closed end cap, molded onto the axial end of the media pack and inner liner, and having first and second simultaneously cured foam portions thereof meeting at a common juncture of the first and second foam portions disposed substantially at the inner boundary of the media pack, with the first foam portion of the closed end cap being disposed radially outward of the second foam portion and the second foam portion having greater rigidity than the first foam portion.

20. The filter element of claim 17, wherein, the first foam portion further comprises, a protruding compliant feature.

21. The filter element of claim 19, wherein the media pack further defines a second axial end thereof, and the filter element further comprises, an open end cap attached to the second axial end and including a substantially radially rigid element operatively engaging the inner liner.

22. The filter element of claim 21, wherein, the open end cap includes a molded portion thereof securing the substantially rigid element to the second axial end of the media pack.

23. The filter element of claim 22, wherein, the molded portion of the open end cap includes a foam material portion thereof, forming a radial seal gasket.

24. The filter element of claim 23, wherein the tubular-shaped media pack also defines an outer boundary thereof, and the filter element further comprises, an outer liner disposed substantially at the outer boundary and secured to the media pack by the open and closed end caps.

25. The method of claim 1, wherein the foam material of the second foam portion has a different chemical composition than the first foam portion, and wherein the chemical composition of the second foam portion provides a greater rigidity of the second foam portion.

26. The filter element of claim 15, wherein the first and second foam portions have differing chemical compositions.

27. The filter element of claim 19, wherein the second foam portion has a different chemical composition than the first foam portion, and wherein the chemical composition of the second foam portion defines the greater rigidity of the second foam portion.

28. The method of claim 1, wherein molding the end cap comprises molding the end cap such that an axial face of the end cap includes exposed parts of the first and second foam portions.

29. The method of claim 3, wherein the protruding compliant feature has a substantially triangular cross-section.

30. The filter element of claim 15, wherein the end cap includes an axial face having exposed first and second foam portions.

31. The filter element of claim 17, wherein the protruding compliant feature has a substantially triangular cross-section.

32. The filter element of claim 19, wherein the closed end cap includes an axial face having exposed first and second foam portions.

33. The filter element of claim 20, wherein the protruding compliant feature has a substantially triangular cross-section.

34. The method of claim 1, wherein the second foam portion is solid and substantially disk-shaped, forming a closed end cap.

35. The method of claim 5, wherein inserting an axial end of the filter media pack into the uncured material in the mold comprises inserting an axial end of the filter media pack into the uncured material in the mold such that the axial end of the tubular-shaped media pack is disposed within a portion of both the first and second foam portions, with the common juncture formed radially outboard of the inner boundary of the media pack, and wherein the inner periphery of the first foam portion is spaced radially outward from the inner boundary.

36. The filter element of claim 15, wherein an axial end of the media pack is molded into a portion of both the first and second foam portions.

37. The filter element of claim 15, wherein the second foam portion is solid and substantially disk-shaped, forming a closed end cap.

* * * * *

UNITED STATES PATENT AND TRADEMARK OFFICE
CERTIFICATE OF CORRECTION

PATENT NO. : 7,740,679 B2 Page 1 of 1
APPLICATION NO. : 11/405725
DATED : June 22, 2010
INVENTOR(S) : Brian T. Ehrenberg It is certified that error appears in the above-identified patent and that said Letters Patent is hereby corrected as shown below:

On the Title page Item [75]:
The inventor's name is listed as:
Brian Ehrenberg, and should be listed as
Brian T. Ehrenberg Col. 9 line 67
In the last line of claim 14, delete:
"n the mold" and add:
"in the mold"

Signed and Sealed this

Seventeenth Day of August, 2010

David J. Kappos
*Director of the United States Patent and Trademark Office*